United States Patent [19]

United States Patent [19]
Jahn

[11] 3,873,008
[45] Mar. 25, 1975

[54] PACKAGE TYPE METERING DEVICE FOR HIGH VISCOSITY FLUID PRODUCTS

[75] Inventor: Ulrich W. K. Jahn, Wehrda, Germany

[73] Assignee: A. Kettenbach Fabrik Chemischer Erzeugnisse, Eschenburg-Wissenbach (Dillkreis), Germany

[22] Filed: May 24, 1974

[21] Appl. No.: 472,459

[30] Foreign Application Priority Data
Jan. 8, 1974 Germany.......................... 7400492

[52] U.S. Cl.................................. 222/390, 222/46
[51] Int. Cl........................................... G01f 11/00
[58] Field of Search ............ 222/390, 386, 392, 46, 222/562

[56] References Cited
UNITED STATES PATENTS
1,027,251  5/1912  Hill .................................. 222/390

1,288,554  12/1918  France ............................... 222/390
1,340,043  5/1920  Grace ................................. 222/390
3,459,315  8/1969  Labatre .............................. 222/562

*Primary Examiner*—Robert B. Reeves
*Assistant Examiner*—H. Grant Skaggs
*Attorney, Agent, or Firm*—Toren, McGeady and Stanger

[57] ABSTRACT

A package type metering device for holding high viscosity fluid products and metering out desired precisely defined quantities of such product, consisting of an elongate cylindrical housing containing a product supply, a dispensing opening at one end, a plunger-type bottom member movable along the inside of the housing by means of a tubular member threadedly engaging a threaded member on the housing, and indicia means for indicating the mouvement of the plunger member and thereby the quantity of product metered out.

2 Claims, 6 Drawing Figures

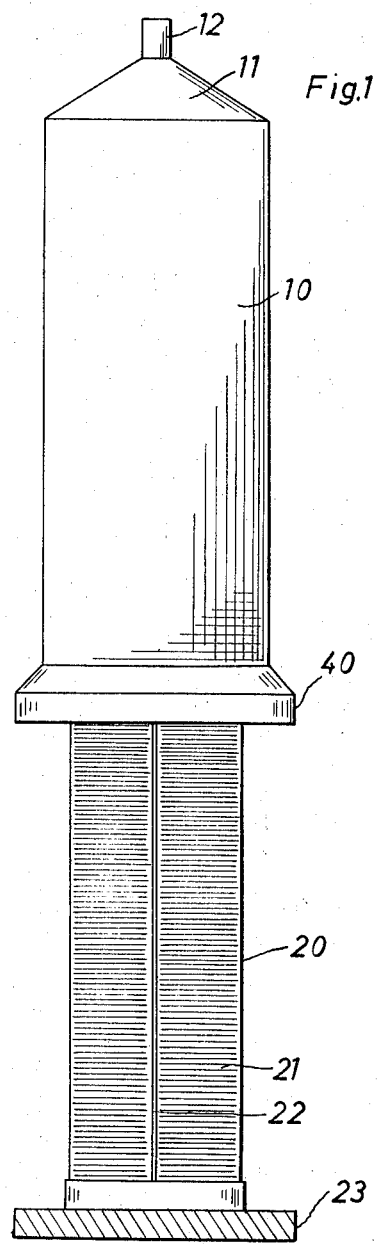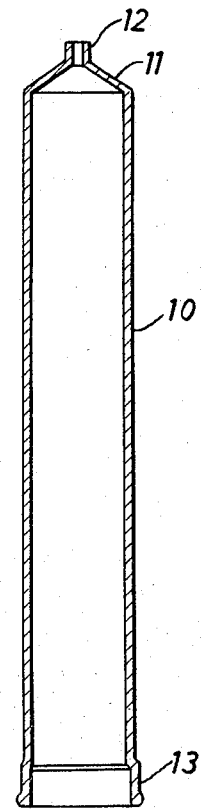

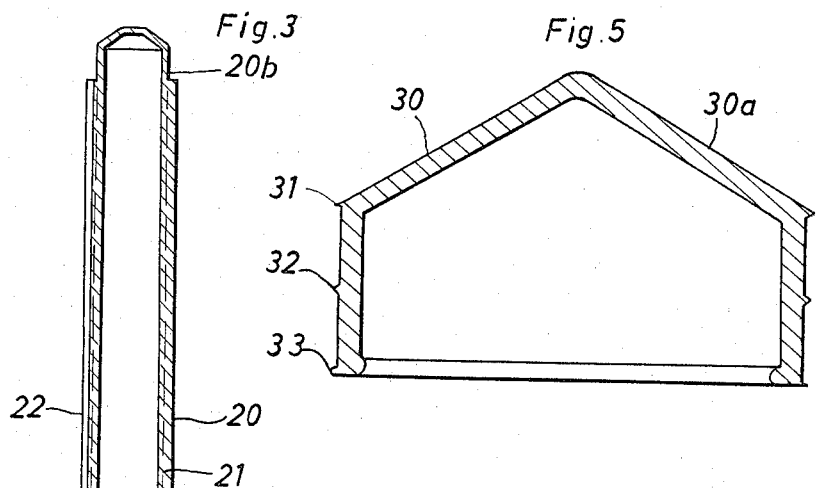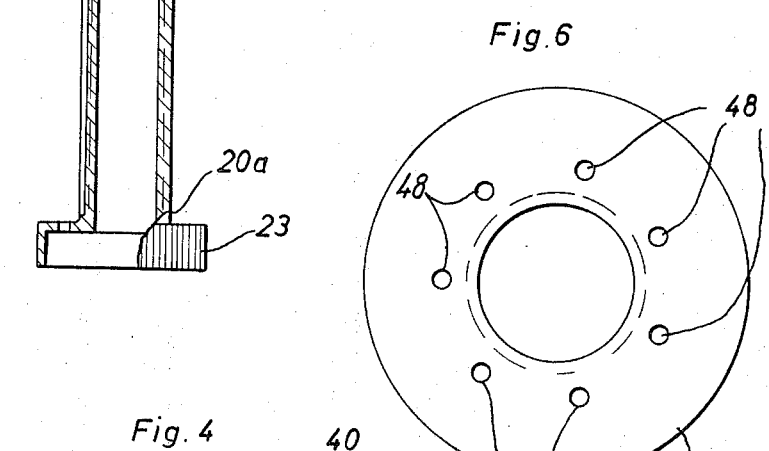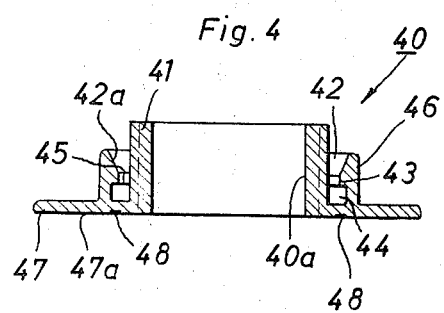

PACKAGE TYPE METERING DEVICE FOR HIGH VISCOSITY FLUID PRODUCTS

The present invention relates to a package type metering device for high viscosity fluid products which device is suitable particularly for metering impression materials in dental applications and for the usage in dental laboratories.

It is the object of the present invention to provide a novel package type metering device for fluid products of a high viscosity, particularly for impression materials such as condensation products of linear polydimethylsiloxanoles with polyalkoxysiloxanes, for the use in the hands of the dentist and in dental laboratories.

It is another object of the present invention to provide a device of the above type allowing the metering of precisely defined quantities of such products in eliminating inadvertent metering errors.

In accordance with the present invention, the novel package type metering device is characterized by a first cylindrical tubular member having a cylindrical body open at its bottom end and closed at its upper end by a fixed upper cover plate member that is conically tapered towards a central discharge orifice; a plunger type bottom member fitted into the cylindrical cavity of the first cylindrical tubular member and movable within the cylindrical member by means of a second cylindrical tubular member having an externally threaded surface threadedly engaging an internal thread of a threaded ring member; the threaded ring member mounted at the open bottom end of the first cylindrical tubular member by a detent means engaging a bead reinforced edge on the open bottom end of the first cylindrical tubular member, a concentric annular groove formed in the threaded ring member, the concentric annular groove flaring conically outwardly towards the outer edge of the groove, a bead shaped shoulder at the inner end of the groove forming a restriction in a passage connecting the inner end of the groove with an annular cavity, the annular cavity adapted to receive and automatically latch the bead shaped reinforced edge of the first cylindrical tubular member when press-fitting the bead reinforced edge into the annular cavity, an inner wall portion of the threaded ring member remote from the internal thread defining together with the bead shaped shoulder a narrow annular orifice of smaller dimensions than the bead reinforced edge on the first cylindrical tubular member, the orifice serving as a detent means for latching the bead reinforced edge when introducing the same in applying pressure into the annular cavity, an outer wall portion of the threaded ring member having an inherent elasticity and connected to a reinforcing flange; a plurality of indicia on an outer surface of the reinforcing flange, the indicia corresponding to a plurality of indicia adjacent a narrow groove extending over the whole length of the outer surface of the second cylindrical tubular member; the second cylindrical tubular member having at its lower end a reinforcing ring with a knurled outer surface and being conically tapered at its upper end, the conically tapered upper end adapted to engage the inner surface of the plunger type bottom member having a frusto-conically tapered bottom wall and about its outer circumference a plurality of piston ring shaped annular ridges whereby the configuration and dimensions of the movable bottom member substantially correspond to those of the internal surfaces of the fixed cover plate of the first cylindrical tubular member.

In the following, the present invention will be further explained by means of a preferred embodiment shown in the appended drawings wherein FIG. 1 is a lateral elevational view of a metering device according to the present invention;

FIG. 2 is a sectional view of the cylindrical hollow body of the metering device;

FIG. 3 is a sectional view of the hollow cylindrical operating body for the bottom member that is movable in the manner of a plunger within the cylindrical cavity of the metering device housing;

FIG. 4 is a fragmentary sectional view showing the threaded ring member mounted on the bottom end of the metering device housing, the internal thread engaging the plunger type operating member;

FIG. 5 is a sectional view of the movable bottom member; and

FIG. 6 is a bottom view of the ring member of FIG. 4.

As shown in FIG. 1, the metering device includes a cylindrical tubular member 10 the lower end of which is closed by a bottom member 30. The bottom member 30 is movable within the cylindrical cavity of the tubular member 10 in the manner of a plunger. The upper end of the tubular member 10 is closed by a fixed upper cover plate member 11 that is conically tapered towards a central discharge orifice 12 (see also FIG. 2).

The movable bottom member 30 may be moved by means of a second cylindrical tubular member 20 having an externally threaded surface 21 and serving as an operating member (FIG. 3).

The thread 21 of the cylindrical tubular member 20 extends over the whole outer surface of this member and is in threaded engagement with an internal thread 41 of a threaded ring member 40. Thus the cylindrical tubular member may be rotated against the threaded ring member 40. The ring member 40 may be fixed to the open bottom end of the cylindrical tubular member 10 by means of a detent mechanism engagable with a bead reinforced edge 13 of the cylindrical tubular member 10. To this end, the ring member 40 is press-fitted onto the bead reinforced edge 13.

The ring member 40 is provided with a concentric annular groove 42 having an outer wall portion 42a flaring conically upwardly and outwardly. At its narrow inner end, this conical edge portion 42a of the groove 42 is followed by a bead shaped shoulder 43 defing a restricted passageway (see FIG. 4).

The shoulder 43 defines the upper boundary of an annular cavity 44 that is in communication with the groove 42 through the restricted passageway. This annular cavity 44 serves to receive the bead reinforced edge 13 of the cylindrical tubular member 10 and to automatically latch this edge within the cavity.

The bead shaped shoulder 43 defines together with the inner wall 40a remote from the internal thread 41 of the threaded ring member 40 a narrow annular orifice 45 that is somewhat narrower than the bead reinforced edge 13 of the cylindrical tubular member 10 so that this edge 13 may be introduced into the annular cavity 44 and latched therein only by applying pressure. To this end, the outer wall 46 of the threaded ring member 40 is of a suitable well-defined elasticity.

At the bottom of the threaded ring member 40 is provided a reinforcing flange 47 bearing on its outer surface 47a several indicia 48 (see FIG. 6). These indicia 48 allow to indicate exactly the angle through which the cylindrical tubular member 20 is rotated, i.e., whether this member is rotated through a full rotation (360°) or a partial rotation. A narrow groove 22 extends over the whole length of the outer surface of the cylindrical tubular member 20 and serves this very same control purpose (see FIG. 3).

For ease of handling, the cylindrical tubular member 20 is provided at its lower end 20a with a reinforcing ring 23 having a knurled outer surface (FIG. 3). The opposite end 20b of the tubular member 20 is conically tapered. This conically tapered end 20b abuts against the inner surface of the movable plunger type bottom member 30 and serves to advance this bottom member 30 along the cylindrical cavity of the tubular member 10 towards the discharge orifice 12.

The movable plunger type bottom member 30 is closed at one end by a conically tapered bottom wall 30a and is provided at its outer cylindrical surface with several narrow ridges such as ridges 31, 32 and 33 projecting from the cylindrical side wall portion in a manner similar to piston rings and serving to seal the bottom member 30 against the inner surface of the tubular member 10 (FIG. 5).

The conical bottom wall 30a of the bottom member 30 is of a configuration and of dimensions similar to those of the fixed cover plate member 11 of the cylindrical tubular member 10. This feature allows to discharge even highly viscous products entirely without leaving any residue within the metering device.

After inserting the plunger type bottom member 30 the threaded ring member 40 is press-fitted onto the edge 13 of the cylindrical tubular member 10 and will then be tightly and irreversibly secured to the same.

All parts of the inventive metering device which simultaneously constitutes a package for the product may be manufactured of any suitable material and particularly of a plastic material. The shape of the various parts is adapted particularly to injection molding. Therefore the metering device may be produced at low cost and notwithstanding its relatively complicated design may serve as a lost package that after usage may be disposed of and burned, and therefore does not contribute to environmental pollution.

By suitable dimensioning, several metering devices may be matched volumetrically to allow dispensing precise dosages at a predetermined precision of any desired combination of multi-component products such as adhesives, resins, elastomer impression materials and the like.

Precise metering may be obtained by counting full or partial revolutions of the cylindrical tubular member 20 or by providing different but equivalent surface ratios of the bottom members 30 and/or by providing different pitches of the threads on the cylindrical tubular member 30 and on the threaded ring member 40.

The operating manipulations for metering products with the inventive metering device are simple. Metering errors cannot occur. The preparation of excess mixtures is avoided and the contents of every package may be used up fully. Base material paste and hardener for preparing an impression material will be supplied in separate metering devices the plungers of which will be advanced by thread engagement. The two metering devices of a couple are matched so that normally one rotation of the tubular member in the one metering device containing a base material paste corresponds to one full rotation of the tubular member of the other metering device containing the hardener. The indicia on the outer ring of the threaded sleeve of the metering device containing the hardener cooperate with the indicia extending along the length of the threaded tubular member. These longitudinal indicia readily allow to control full or partial rotational movements. Many variations and modifications will be evident to the one skilled in the art. The metering device will be distributed as a normal sales package.

What is claimed is:

1. A package type metering device for high viscosity fluid products, particularly suitable for metering impression materials in dental applications and for the usage in dental laboratories, characterized by a first cylindrical tubular member having a cylindrical body open at its bottom end and closed at its upper end by a fixed upper cover plate member that is conically tapered towards a central discharge orifice; a plunger type bottom member fitted into the cylindrical cavity of said first cylindrical tubular member and movable within said cylindrical member by means of a second cylindrical tubular member having an externally threaded surface threadedly engaging an internal thread of a threaded ring member; said threaded ring member mounted at said open bottom end of said first cylindrical tubular member by a detent means engaging a bead reinforced edge on the open bottom end of said first cylindrical tubular member, a concentric annular groove formed in said threaded ring member, said concentric annular groove flaring conically outwardly towards the outer edge of said groove, a bead shaped shoulder at the inner end of said groove forming a restriction in a passage connecting the inner end of said groove with an annular cavity, said annular cavity adapted to receive and automatically latch said bead reinforced edge of said first cylindrical tubular member when press-fitting said bead reinforced edge into said annular cavity, an inner wall portion of said threaded ring member remote from the internal thread defining together with said bead shaped shoulder a narrow annular orifice of smaller dimensions than said bead reinforced edge on said first cylindrical tubular member, said orifice serving as a detent means for latching said bead reinforced edge when introducing the same in applying pressure into said annular cavity, an outer wall portion of said threaded ring member having an inherent elasticity and connected to a reinforcing flange; a plurality of indicia on an outer surface of said reinforcing flange, said indicia corresponding to a plurality of indicia adjacent a narrow groove extending over the whole length of the outer surface of said second cylindrical tubular member; said second cylindrical tubular member having at its lower end a reinforcing ring with a knurled outer surface and being conically tapered at its upper end, said conically tapered upper end adapted to engage the inner surface of said plunger type bottom member having a frusto-conically tapered bottom wall and about its outer circumference a plurality of piston-ring shaped annular ridges whereby the configuration and dimensions of said movable bottom member substantially correspond to those of the internal surfaces of said fixed cover plate of said first cylindrical tubular member.

2. A package type metering device as recited in claim 1 wherein the pitch of the external thread of said second cylindrical tubular member is different from the pitch of the internal thread of said threaded ring member.

* * * * *